(12) United States Patent
Irwin et al.

(10) Patent No.: US 7,201,187 B2
(45) Date of Patent: Apr. 10, 2007

(54) LOW-FLOW VALVE

(75) Inventors: Kevin M. Irwin, Tucson, AZ (US); Philip G. Roper, Tucson, AZ (US); Matthew M. Salviano, Tucson, AZ (US); John E. Thompson, Orange, CA (US); Clint Haas, Tucson, AZ (US); Victor Olivas, Tucson, AZ (US)

(73) Assignee: Rain Bird Corporation, Glendora, CA (US)

( * ) Notice: Subject to any disclaimer, the term of this patent is extended or adjusted under 35 U.S.C. 154(b) by 91 days.

(21) Appl. No.: 10/897,446

(22) Filed: Jul. 23, 2004

(65) Prior Publication Data

US 2006/0016494 A1    Jan. 26, 2006

(51) Int. Cl.
*F16K 1/00* (2006.01)

(52) U.S. Cl. .................. 137/625.28; 251/210; 251/331

(58) Field of Classification Search .......... 137/625.28; 251/210, 61.1, 331
See application file for complete search history.

(56) References Cited

U.S. PATENT DOCUMENTS

| | | | |
|---|---|---|---|
| 2,623,542 A | 12/1952 | Obermaler | |
| 2,784,732 A | 3/1957 | Nurkiewicz | |
| 3,034,761 A * | 5/1962 | Janquart | 251/210 |
| 3,768,771 A | 10/1973 | Dicken, Jr. | |
| 3,918,477 A | 11/1975 | Grams | |
| 4,387,878 A | 6/1983 | Zukausky | |
| 4,500,067 A | 2/1985 | Zukausky | |
| 4,844,112 A | 7/1989 | Pick et al. | |
| 4,987,920 A | 1/1991 | Donner | |
| 5,398,720 A | 3/1995 | Cole et al. | |
| 5,836,571 A * | 11/1998 | Streitman et al. | 251/331 |
| 5,887,848 A | 3/1999 | Wilson | |
| 5,967,182 A | 10/1999 | Wilson | |
| 5,996,608 A | 12/1999 | Hunter et al. | |
| 6,182,689 B1 | 2/2001 | Lauer et al. | |
| 6,216,730 B1 | 4/2001 | Hall | |
| 6,260,576 B1 | 7/2001 | Allen | |
| 6,722,384 B2 | 4/2004 | Gates | |
| 2002/0179871 A1 | 12/2002 | Verdecchia | |

* cited by examiner

*Primary Examiner*—Eric Keasel
*Assistant Examiner*—Craig Schneider
(74) *Attorney, Agent, or Firm*—Fitch, Even, Tabin & Flannery

(57) ABSTRACT

A low-flow diaphragm valve is disclosed having a flexible diaphragm that cooperates with a portion of the valve body to open and close the valve. The diaphragm may have a portion for seating in a passage between the inlet and outlet of the valve and may have one or more ribs for seating against other portions of the body located around the passage. While the valve body may include openings or interruptions to permit fluid and small particulate matter to flow through the valve, the ribs and openings block or restrict particulate matter of relatively large size from flowing to the passage between the diaphragm and the valve body. With this structure, the valve will function even when particulate matter is trapped between one or more of the diaphragm portion that sits in the passage and ribs, on the one hand, and the body on the other hand.

15 Claims, 8 Drawing Sheets

LOW-FLOW VALVE

FIELD OF THE INVENTION

The invention relates to a valve and, in particular, to a low-flow valve with improved sealing characteristics.

BACKGROUND OF THE INVENTION

Currently, low-flow fluid systems are utilized for controlled irrigation of crops, vegetation, landscaping, and the like. Commonly, these flow systems utilize a fluid or water source, a pumping system in communication with the water source, a network of fluid delivery conduits or pipes, a plurality of end point emitters for fluid dispersement, one or more control valves for opening or closing the fluid delivery conduits to turn on or off the emitters, and a number of controllers for actuating the valves. The emitters provide a slow drip or trickle flow. Furthermore, each valve may be paired with a debris trap for collecting particulate matter that cannot escape through the emitter itself. A representative low-flow system may include 10–15 valves on a single controller, and each valve may communicate with 20–100 emitters.

These low fluid flow systems are often used where water is a more scarce commodity, such as in arid and low precipitation environments where water is quickly evaporated. By using these systems, water can be delivered to landscaping in a controlled manner without spraying the water in the air where a substantial portion may evaporate quickly and without distributing the water over a surface area that will not benefit. Instead, the drip or trickle generally goes straight to the ground where it is absorbed and feeds any plants in close proximity to the sprinkle, allowing for less water waste.

By their nature, much of the vegetation that survives in an arid environment does so precisely because of low water consumption needs. Still, the attractiveness of the vegetation, such as landscaping, or the quality of crops grown, depends on a reliable delivery of water.

However, plants that have low water consumption needs typically do not respond well to over-watering. If the plants become soaked for long periods of time, the plants can die or their roots may suffer damage, such as root-rot. Furthermore, such plants often survive in loose soil or soil with a significant amount of sand, which contributes to the soil's inability to absorb excess water. This type of soil can become over-saturated easily, and the plants may not be able to remain in the loosened soil. For at least these reasons, unreliable controls and the valves for these irrigation systems can be expensive to crops.

A well-known design for low-flow valves is a diaphragm valve. This type of valve has an inlet and an outlet with the diaphragm positioned between them. A control is used to move a portion of the flexible diaphragm between a closed position that seals a passage between the inlet and outlet and an open position whereby water is permitted to flow by the diaphragm. The moving portion of the diaphragm usually includes a dome-shaped structure disposed in a facing relationship with an annular or cylindrical port intermediate the inlet and outlet. In operation, the dome presses against and into the cylindrical port to close the valve, as well as moves away from the cylindrical port to permit water to pass between the dome and cylindrical port and through the valve.

At times, foreign particulate matter, such as dirt, may be in the water passing through the conduit and the low-flow valve. Most foreign particulate matter that enters the irrigation system does not present a significant issue. In addition, most particulate matter such as dirt is relatively small. When dirt moves with the water stream through the system, most of such dirt will pass through the valve without issue. However, some dirt can become lodged between the cylindrical port and the dome when the dome attempts to move from the open position to the close, thereby trapping the dirt between the cylindrical port and the dome.

At times, the particulate matter may be introduced during the construction or operation of the low-flow system itself. For instance, the fluid delivery pipes are often polyvinyl chloride (PVC) piping that is custom fit at the connections. When cutting or otherwise preparing the PVC piping, it is recognized that some shavings or waste material may enter the pipe itself, eventually being passed through the system to the low-flow valve. PVC shavings and other material that is neutral buoyant, or materials that do not sink in stagnant water, will follow the water stream without a significant flow rate. Accordingly, these materials may have a much larger size than the previously discussed dirt particles. This size frequently can be larger than the gap between the dome and the cylindrical port of the opened low-flow valve, and can become lodged against or within the gap.

In the event dirt or other foreign material becomes trapped between the dome and the cylindrical port, the valve may not close sufficiently and will allow an undesirable amount of water to still pass through the valve. The material may become lodged when the valve is open and the dome is positioned away from the cylindrical port, or it may become caught when the dome moves towards and against the cylindrical port as the valve is being closed.

The trapped material can prevent the valve from properly closing. More specifically, dirt or other material lodged between the dome and the cylindrical port may allow a portion of the dome adjacent to the material not to contact the cylindrical port. In such an event, an undesirable amount of water may continue to pass through the valve. This may result in an unnecessary use of water or in over-irrigation of the soil and plants, as well as other undesirable results.

In a typical valve of this kind, closing the valve can be violent and provide shock to the flow system and valve. For instance, the dramatic drop in flow can cause rapid changes in pressure along the system. In addition, as the valve is closing, the water passing therethrough will accelerate as it tries to pass through an ever-narrowing opening. This causes a high amount of friction between the water and the dome or diaphragm, causing the diaphragm to be pulled towards the cylindrical port or diaphragm seat. More specifically, the diaphragm is rapidly accelerated into the seat, thereby causing the diaphragm to bounce against and away from the seat. When the diaphragm bounces in this manner, it moves away again from the seat and allows more water to pass through the valve. This may be repeated multiple times, and will continue until the force pushing the diaphragm into a seated, generally closed position damps and overpowers this bouncing or vibration.

Accordingly, there has been a need for an improved low-flow valve.

DESCRIPTION OF THE PREFERRED EMBODIMENTS

Figure 1:
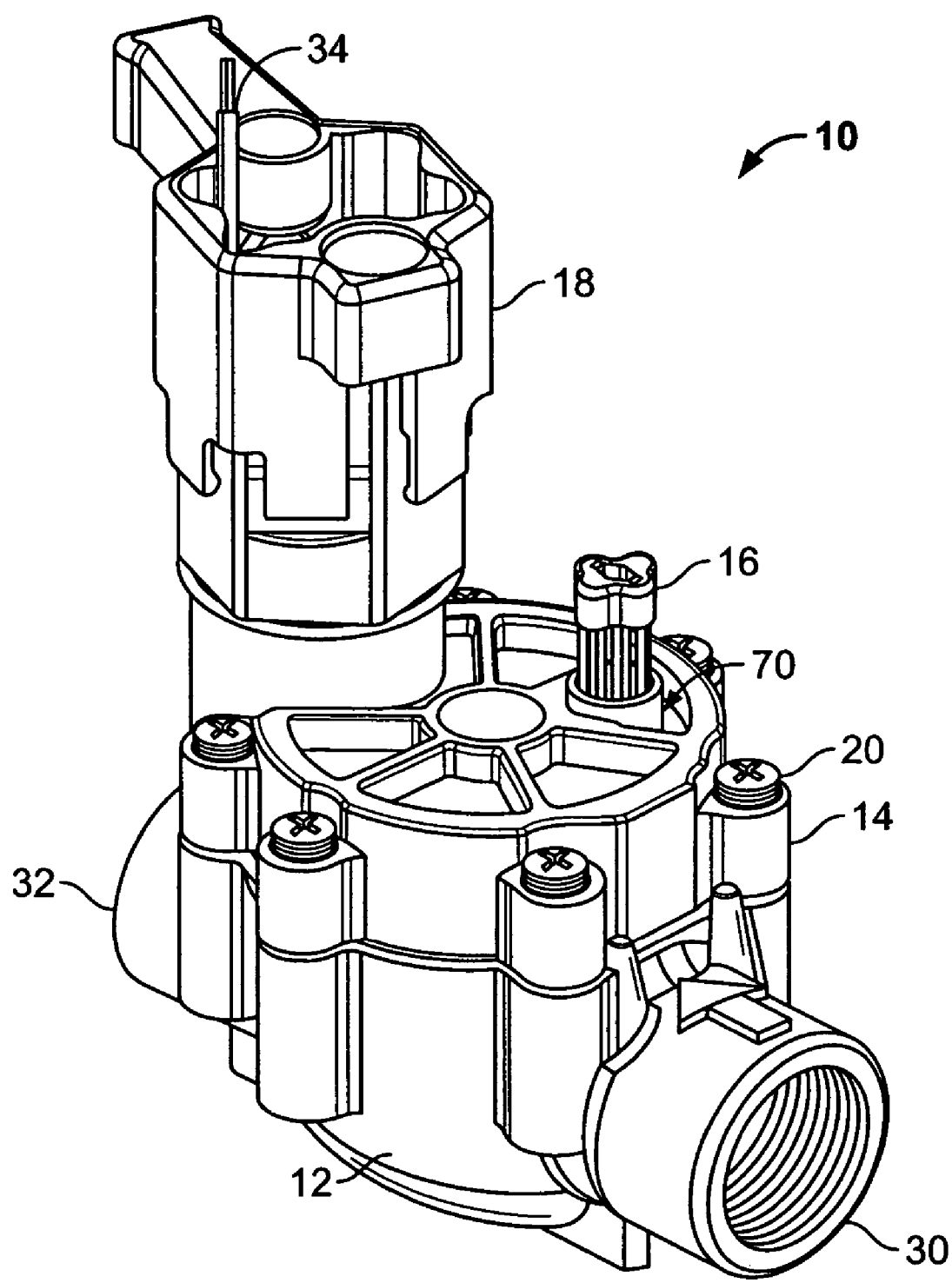
FIG. 1 is a perspective view of a low-flow valve including features of the present invention.

Referring initially to FIGS. 1–4, a low-flow valve system 10 is depicted and includes a valve body 12, a body cover 14, a manual pressure release knob 16, and a valve actuator in the form of an electric solenoid system 18. In use, the low-flow valve system 10 is connected to a water source (not shown) such that water enters the valve body 12 at an inlet 30, and is connected to a distribution pipe (not shown) that is connected to one or more emitters or sprinklers (not shown) at an outlet 32. To control the opening or closing of the low-flow valve system 10, the solenoid 18 is actuated and controlled by electrical leads 34.

Figure 2:
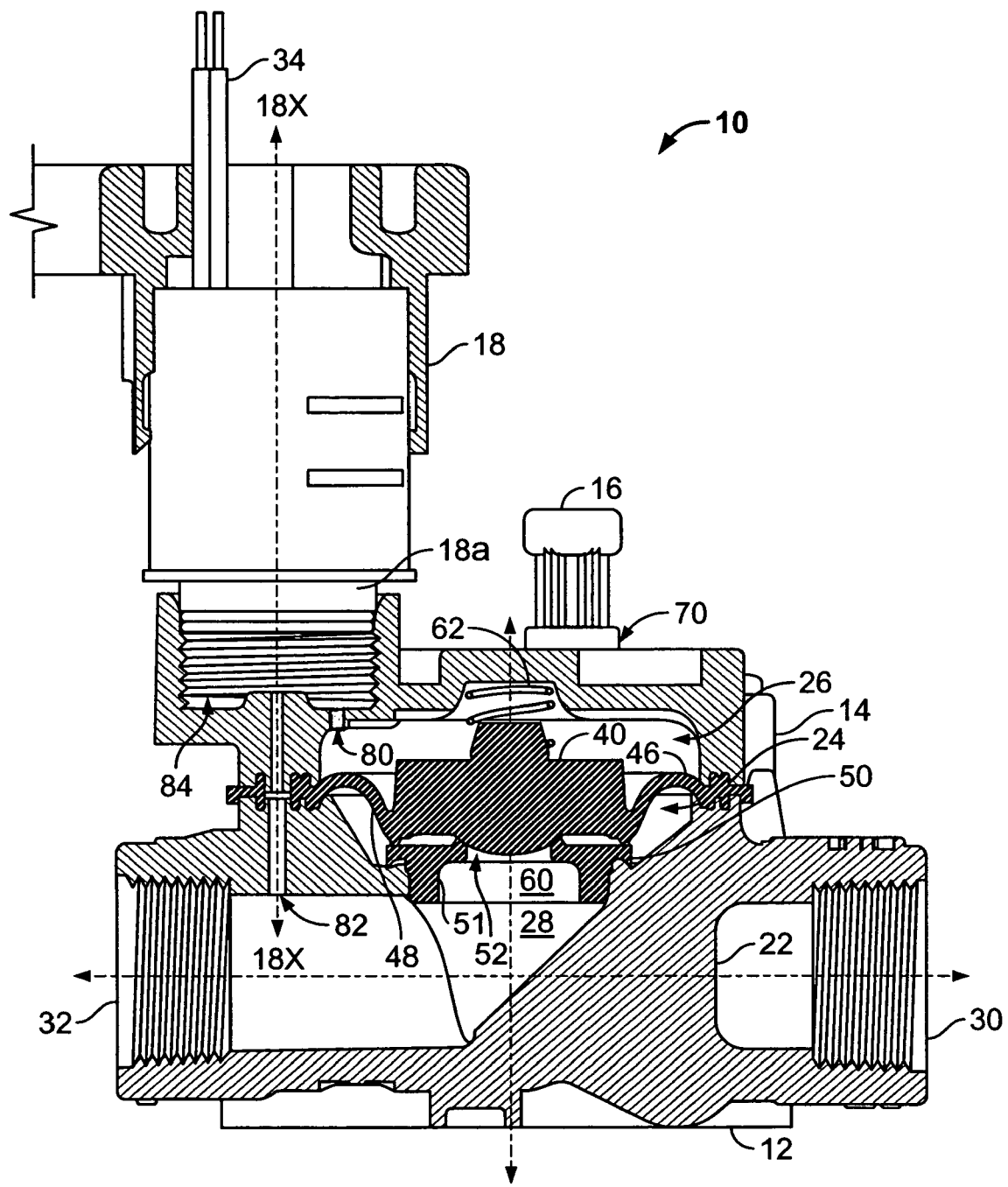
FIG. 2 is a cross-sectional view of the valve of FIG. 1.
Figure 3:
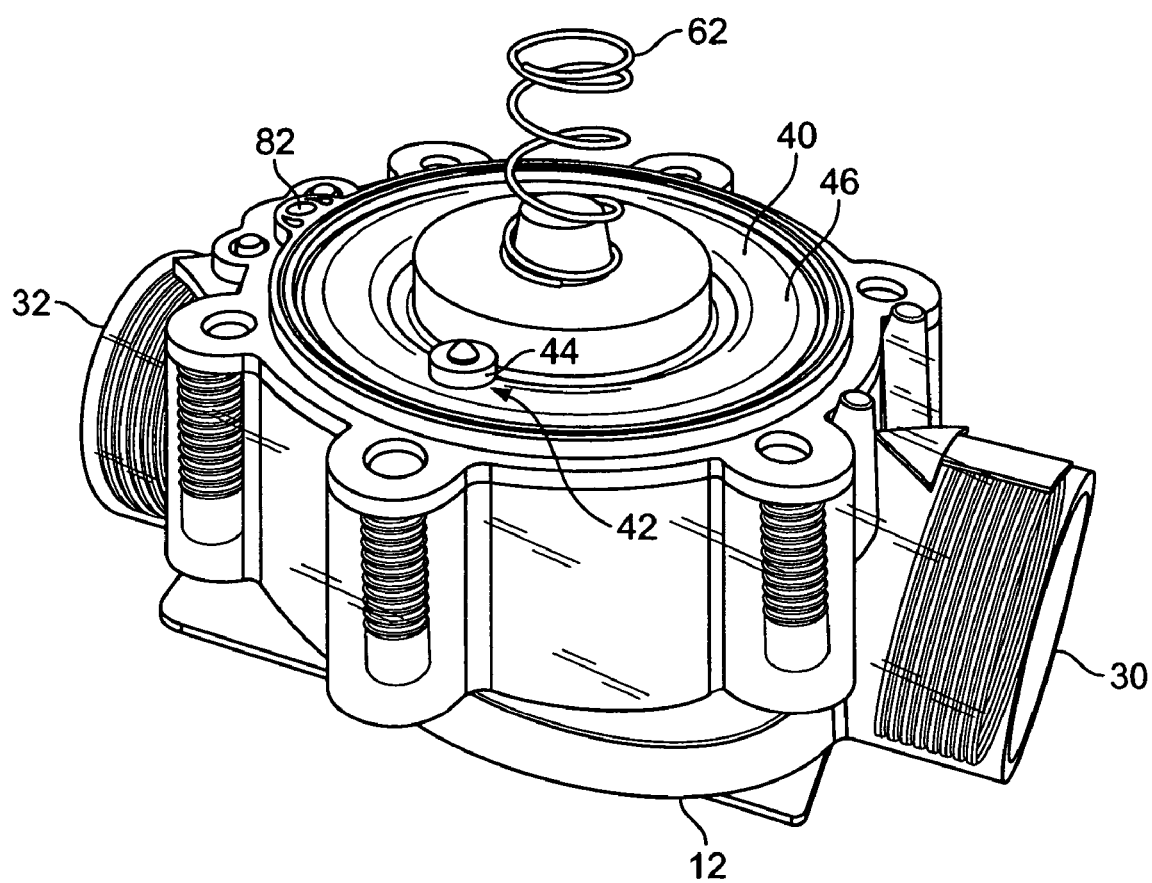
FIG. 3 is a perspective view of a valve body and diaphragm of the valve of FIG. 1.
Figure 4:
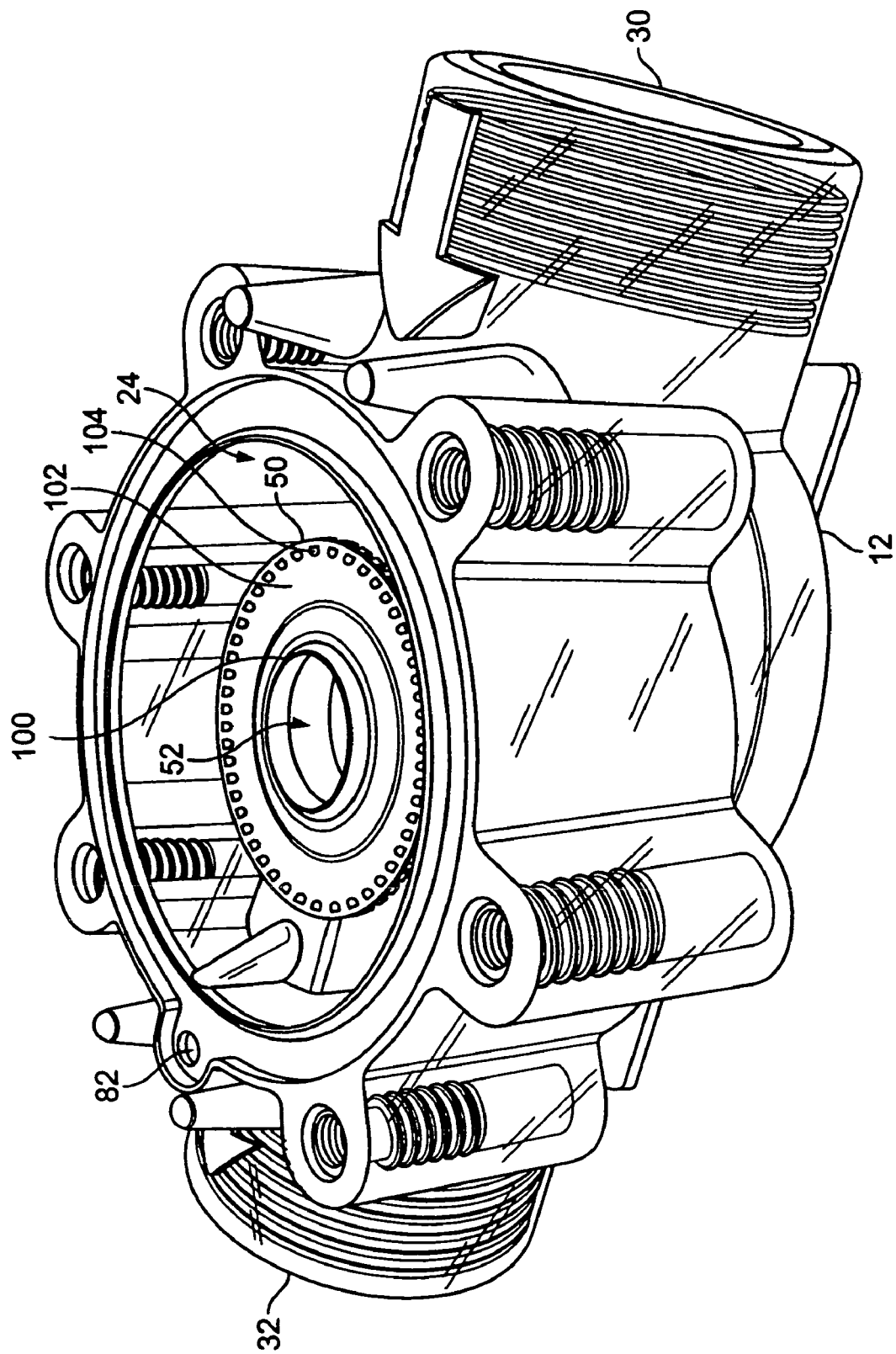
FIG. 4 is a perspective view of the valve body of FIG. 3, including a first embodiment of a valve seat insert.

In FIG. 2, the low-flow valve system 10 is depicted with a first embodiment of a flexible, resiliently deformable diaphragm 40 and with the valve body 12 including a first embodiment of a valve seat insert 50. As can be seen, the diaphragm 40 contacts the insert 50 to form a closed position so that fluid is prevented from flowing through the valve system 10, as will be discussed in greater detail below. The body cover 14 is attached to the valve body 12, such as by screws 20, with a portion of the diaphragm 40 sandwiched therebetween such that the valve body 12, the diaphragm 40, and the body cover 14 are sealed along their interfaces.

There is a line pressure from the water source at the inlet 30 of the valve body 12, and the line pressure is generally in the order of 15–150 psi. In the closed position, the pressure at the outlet 32 is generally atmospheric, much lower than the line pressure. As the water enters the valve body 12, it is separated by a septum 22 and fills an outer cavity 24 in the valve body 12. In order to reach the outlet 32, the water must pass through a cylindrical port 60 located in the center of the valve body 12 and below the insert 50. As can be seen, the insert 50 defines a passage or center opening 52 that is generally blocked when the diaphragm 40 is in the closed position. In the absence of the diaphragm 40, the water would flow up over the sides of the insert 50, into the cylindrical port 60, and through the outlet 32. The insert 50 includes a raised annular seat 51 that is secured within the cylindrical port 60, as shown, and is preferably electronically welded therein. However, it should be noted that the insert 50 may be integral with the valve body 12.

The line pressure at the inlet 30 holds the diaphragm 40 in a static, closed position. More specifically, the diaphragm 40 has a small bleed port 42 (FIG. 5) and a screen 44 (FIG. 3) located therein. As water enters the outer cavity 24, it will also bleed through the screen 44 into an upper cavity 26 above the diaphragm 40 and below the body cover 14. Accordingly, the pressure in the outer cavity 24 below the diaphragm and in the upper cavity 26 above the diaphragm 40 will equilibrate. There is also a central cavity 28 located below the center opening 52 of the insert 50 leading to the outlet 32. This central cavity 28 is at atmospheric pressure. In this manner, the entire area of the top surface 46 of the diaphragm 40 is at line pressure, while a portion of the bottom surface 48 is at atmospheric pressure. Therefore, the forces (pressure×area) are greater on the top surface 46 of the diaphragm 40 than on the bottom surface 48. When the diaphragm 40 moves to the closed position from an open position, the water bleeds through the bleed port 42 slowly, so that the movement of the diaphragm 40 to the closed position has a short delay. This prevents a sudden shock on the irrigation system from the water flow suddenly halting.

As further illustrated, a coil spring 62 is positioned within the upper cavity 26 to bias the diaphragm 40 towards the closed position. The coil spring 62 preferably exerts a force of 10 pounds or less, which is a small amount in comparison to the pressure difference between the top and bottom surfaces 46, 48 of the diaphragm 40 due to the line pressure versus the atmospheric pressure. The presence of the coil spring 62 serves to promote and add longevity to the resiliency of the diaphragm 40. The coil spring 62, however, is optional.

The manual pressure release knob 16 is located on the top of the body cover 14. In a simple form, the body cover 14 has a release port 70 passing through the body cover 14 from the upper cavity 26 to the atmosphere. The release port 70 is internally threaded, and the release knob 16 is screw-like with external threads that mate with internal threads of the release port 70 of the body cover 14. By turning the release knob 16 down, the release port 70 is closed and sealed. In the event that the irrigation is shut off, the release port 70 may be opened by rotating the release knob 16 up, so that the pressure within the upper cavity 26 is released, thereby also releasing the line pressure from the outer cavity 24, the inlet 30, and the system itself.

Referring to FIG. 2, the body cover 14 can be seen with an actuator passage 80 and an escape passage 82. The actuator passage 80 leads from the upper cavity 26 to a solenoid cavity 84, while the escape passage 82 leads from the solenoid cavity 84 to the outlet 32, which is at atmospheric pressure when the valve is closed. The solenoid system 18 is threaded into the solenoid cavity 84 of the body cover 14 such that its lower end 18a resides in the solenoid cavity 84. The solenoid system 18 includes an electrically actuated solenoid (not shown) that moves in piston-like fashion along the solenoid axis 18X. By energizing the solenoid system 18, the solenoid moves away from the solenoid cavity 84 to permit the passage of water from the actuator passage 80 to the escape passage 82 to open the valve system 10. When the solenoid system 18 is deactivated, a spring (not shown) within the solenoid system 18 biases the solenoid toward the solenoid cavity 84 to prevent the passage of water from the actuator passage 80 to the escape passage 82 to close the valve. Preferably, the solenoid opens or closes the escape passage 82. In this manner, the pressure in the upper cavity 26 is maintained at line pressure when the solenoid is closed, and the pressure is released when the solenoid is opened.

More specifically, when the solenoid is actuated to an open position such that the pressure in the upper cavity 26 is released to the solenoid cavity 84, the pressure in the upper cavity 26 drops to the atmospheric pressure at the outlet 32. Because of this pressure drop, the pressure holding the diaphragm 40 against the insert 50 is substantially relieved. Accordingly, the diaphragm 40 moves from the closed position to an open position, whereby water is able to pass from the outer cavity 24, over the sides of the insert 50, through the insert 50, and into the central cavity 28 for delivery through the outlet 32 to the emitters or other irrigation piping and other water distribution devices. When the solenoid is moved from the open position to the closed position, the water once again is forced through the bleed port 42 to the top surface 46 of the diaphragm 40 such that the pressure increases on the top surface 46, and hence, the diaphragm 40 closes against the insert 50.

As can be appreciated, the solenoid system 18 may be threadably removed, or partially removed, to release the pressure within the valve body 12 in the same manner as is achieved by the pressure release knob 16.

Foreign particulate matter, such as dirt or PVC shavings, may be floating in or on the water stream, or may simply be forced along with the water, through the valve system 10. The diaphragm 40 and the insert 50 each have particularized features to reduce the likelihood of particulate matter being trapped therebetween and to sufficiently close the valve to prevent an undesirable amount of water from passing through the valve. It is preferred that, in the closed position, the valve system 10 prevents all passage of water therethrough.

Figure 5:
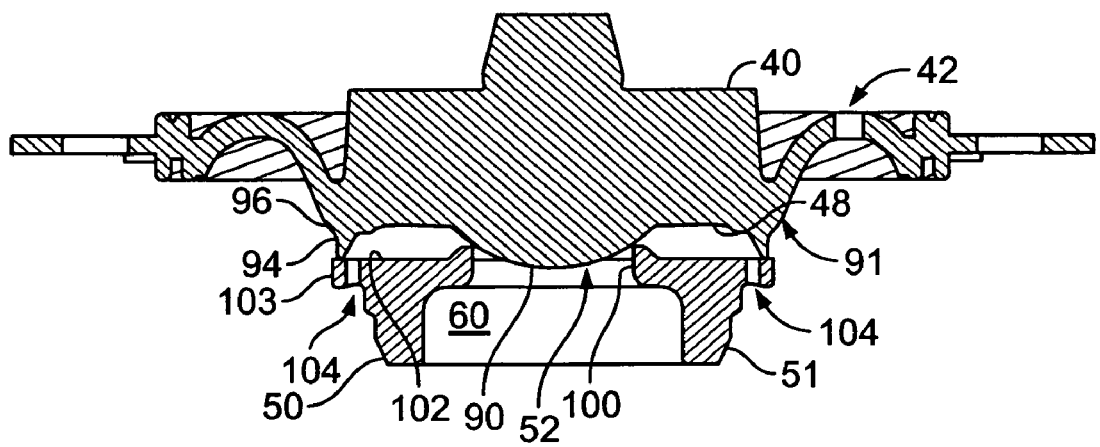
FIG. 5 is a cross-sectional view of a first embodiment of a diaphragm and the insert of FIG. 4 in a closed position.

As can be seen in FIG. 5, the first embodiment of the diaphragm 40 is depicted in a closed position with the first embodiment of the insert 50. The bottom surface 48 of the diaphragm 40 has a sealing portion 91 including a central dome 90, while the insert 50 has an annular ridge 100 around the periphery of the center opening 52. A portion of the central dome 90 seats against the ridge 100 when the diaphragm 40 is in a closed position.

The sealing portion 91 of the diaphragm 40 further has a resiliently deformable annular ridge or rib 94 located near an outer edge 96 of the diaphragm 40. Extending radially from the ridge 100 and the center opening 52 is a generally flat disc-shaped portion 102. The rib 94 is preferably V-shaped in cross-section, though it may also have a flat or rounded leading edge. The rib 94 of the diaphragm 40 is compressed against the portion 102 when in a closed position. Because of the V-shape, the rib 94 may flatten somewhat against the portion 102, as is shown.

Figure 6:
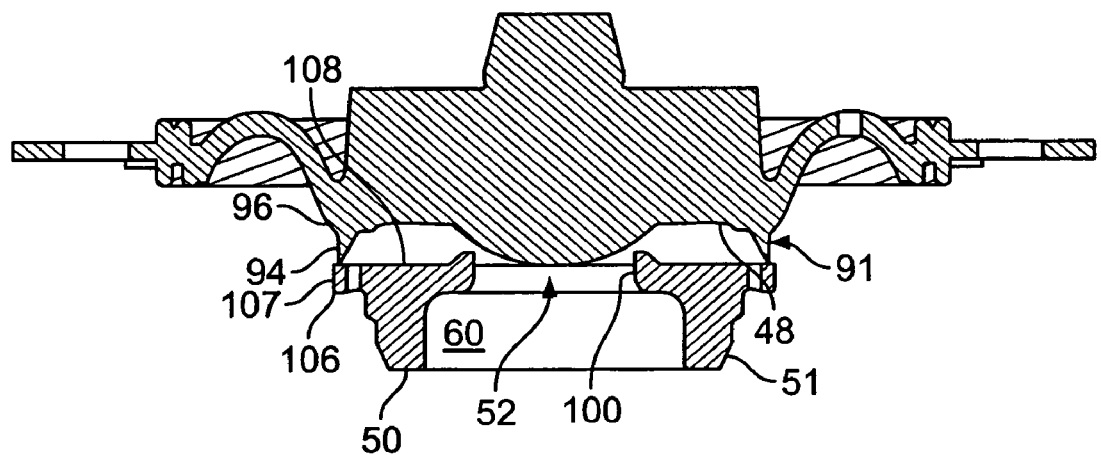
FIG. 6 is a cross-sectional view corresponding to FIG. 5 in a first open position.

The insert 50 further includes small openings 104 located around the radial periphery 103 of the insert 50 and the portion 102. As is illustrated in FIG. 6, the openings 104 pass from a bottom side 106 to a top side 108 of the disc-shaped portion 102, and may also include holes or slots entering from an outer circumferential surface 107. In the closed position, the rib 94 is seated outboard or radially outward from the openings 104 on the top side 108 of the disc-shaped portion. Accordingly, the valve system 10 is sealed by the diaphragm dome 90 pressed against the ridge 100 of the insert 50.

The insert 50 and the diaphragm 40 may cooperate in a plurality of positions that permit some measure of flow through the valve system 10. An intermediary position is depicted in FIG. 6 having the diaphragm 40 partially moved from the insert 50. As can be seen, the rib 94 remains in contact with the top side 108 of the insert 50, though the dome 90 is not in contact with the ridge 100. In this configuration, the openings 104 block or screen foreign particulate matter from passing between the insert 50 and the diaphragm 40. More specifically, particulate matter may pass through the openings 104 if its size is sufficiently small, while large particulate matter is not able to enter. In this manner, particulate matter that is able to enter will typically be of a dimension and weight that the water stream can carry the particulate matter through the valve system 10 to the outlet 32 and the potential for particulate matter to become trapped between the dome 90 and the ridge 100 is reduced or, preferably, eliminated. Though the dome 90 is spaced from the ridge 100, the rib 94 is in contact with the insert 50 because it is less compressed than when it is in the closed position of FIG. 5.

Figure 7:
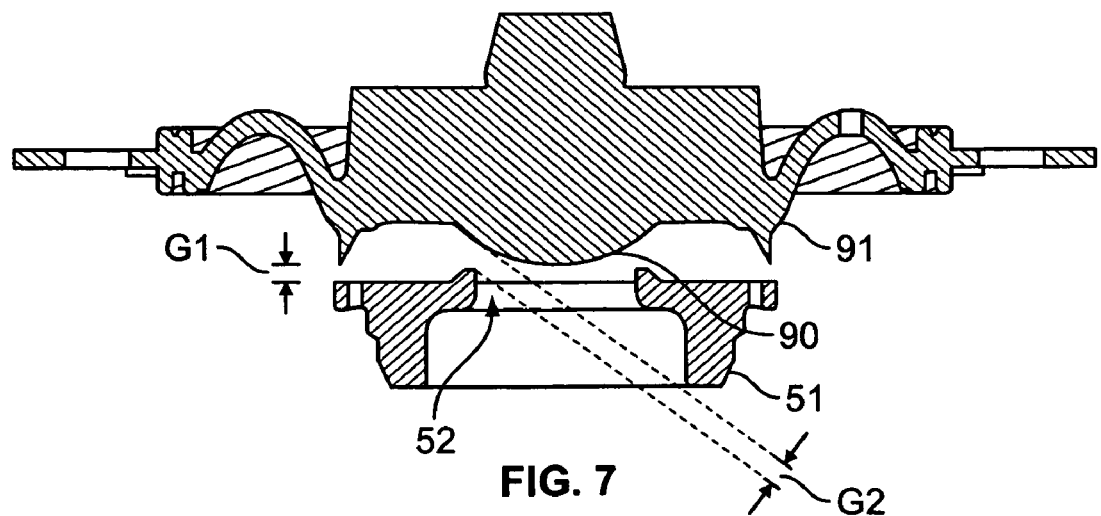
FIG. 7 is a cross-sectional view corresponding to FIG. 5 in a second open position.

An open position is depicted in FIG. 7 in which both the rib 94 and the dome 90 are separated from the insert 50. In this position, the water stream may carry particulate matter between the rib 94 and the insert 50, as well as through the openings 104. Like the size of the openings 104, the gap G1 between the rib 94 and insert 50 serves to block or screen particulate matter whose size exceeds a certain dimension such that particulate matter passing therebetween will be small enough to continue to be carried through the valve system 10 by the water stream. This gap G1 is preferably sized such that it is smaller than a gap G2 between the dome 90 and the ridge 100.

By way of example, the open position of the diaphragm 40 may have the gap G1 being in the order of 0.140 inches, with a variance of approximately 0.020 inches. At the same time, the gap G2 may be 0.160 inches, with an identical variance. In other words, the gap G2 is specified as being approximately 0.020 inches greater than the gap G1, regardless of what the size of gap G1. Therefore, as the diaphragm 40 moves first to the intermediary position and then to the closed position, the gaps G1, G2 will be reduced, while the gap G2 will remain approximately 0.020 inches larger. At an exemplary position where the gap G1 is reduced to 0.015 inches, the gap G2 would be approximately 0.035 inches. At this exemplary position, particulate matter that were to pass through the 0.015 inch gap G1 would easily pass through the 0.035 gap G2.

In addition, the use of the open position of FIG. 7 provides a staged closing. In other words, because the closing of the diaphragm 40 is dependent on water flowing through the bleed port 42, as discussed above, there is a slight delay from when the solenoid system 18 is de-energized to close the diaphragm 40 to the time when the diaphragm 40 has actually closed. During this time, the rib 94 and dome 90 will approach the insert 50, and the rib 94 will contact the insert 50 prior to the dome 90 doing so, as is represented by FIG. 6. After the rib 94 presses against the insert 50, the water within the periphery of the rib 94, as well as any particulate matter, will continue to pass through the center opening 52 of the insert. This will occur because of the water's momentum, the compression of the diaphragm 40 as the volume between the diaphragm 40 and the insert reduces, and because water is still permitted to flow through the openings 104. A short period later, the dome 90 will contact the ridge 100 to seal thereagainst such that the valve system 10 is closed.

Figure 8:
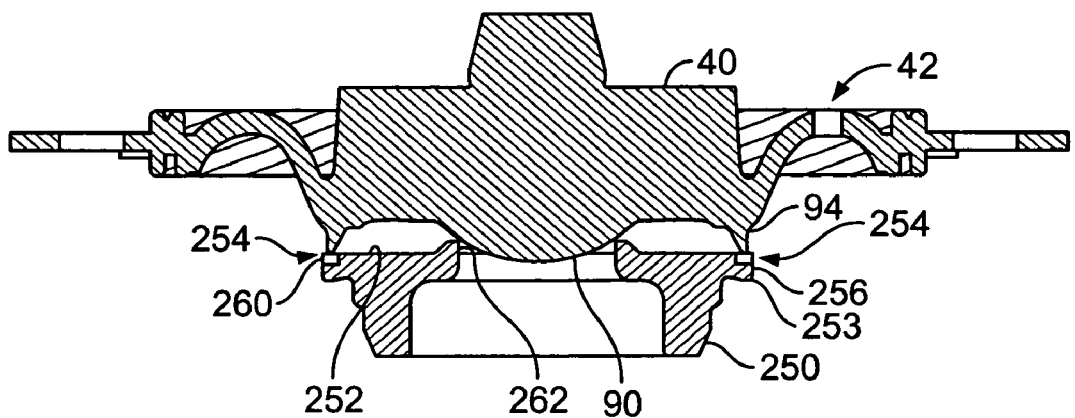
FIG. 8 is a cross-sectional view of the first embodiment of the diaphragm and a second embodiment of a valve seat insert in a closed position.
Figure 9:
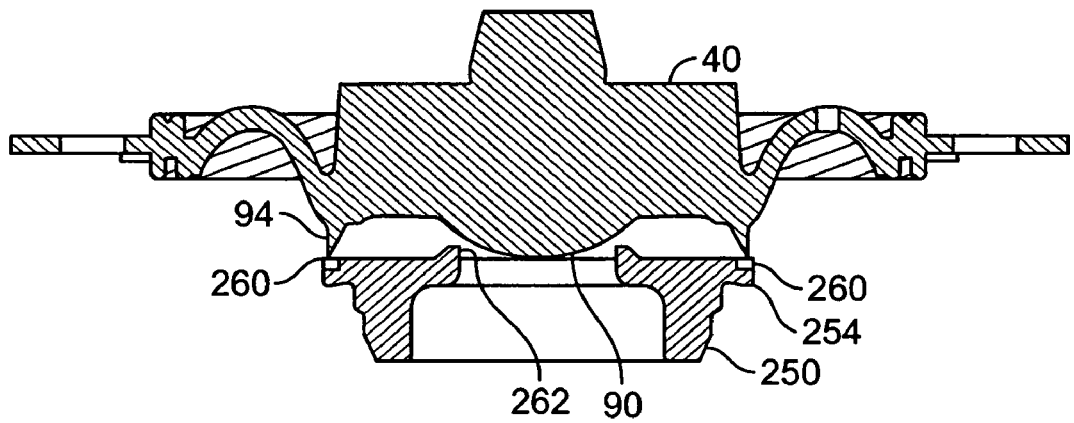
FIG. 9 is a cross-sectional view corresponding to FIG. 8 in a first open position.
Figure 10:
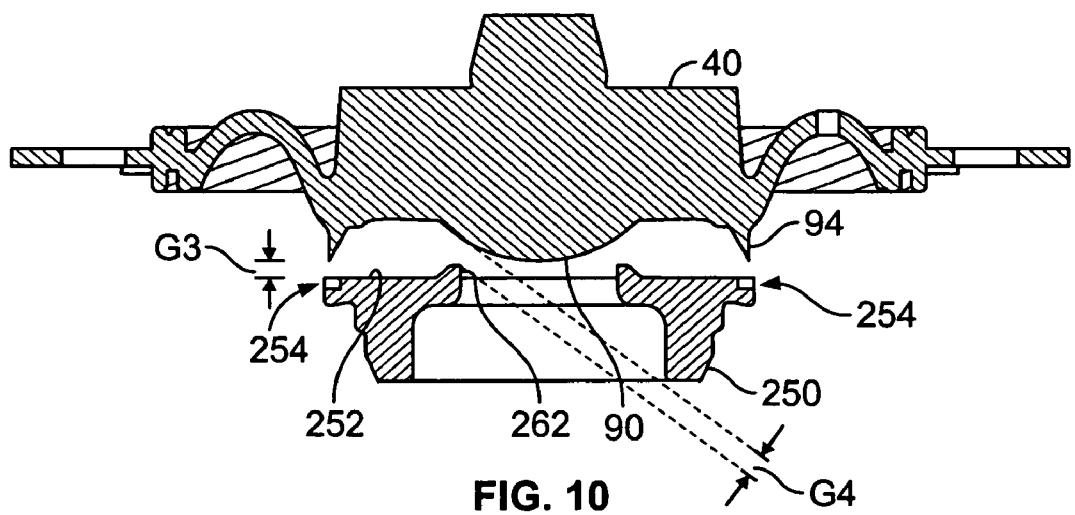
FIG. 10 is a cross-sectional view corresponding to FIG. 8 in a second open position.

A second embodiment of the insert, referenced herein as insert 250, is depicted in FIGS. 8–10 in cooperation with the diaphragm 40. The insert 250 has an interrupted radial periphery 253 such that a top side 252 has small notches 254 extending radially outward and on an outside circumferential surface 256. As can be seen, the rib 94 of the diaphragm 40 is positioned near the radial periphery 253 of the top side of the insert 250. Together, the rib 94 and the top side notches 254 define openings 260 for permitting water and small particulate matter to pass therethrough, while prohibiting relatively large particulate matter from passing. Again, the insert 250 has an annular ridge 262 that forms a seal with the dome 90, as described for insert 50 and as shown in FIG. 8.

FIG. 9 shows the insert 250 and diaphragm 40 in an arrangement similar to that of FIG. 6. The dome 90 is actuated to move a short distance away from the ridge 262 to permit passage of water and particulate matter that is able to pass through the openings 260, while particulate matter sized too large to pass through the openings 260 is stopped by the rib 94 and notches 254. As for insert 250, particulate matter that passes through the openings 260 will typically be carried by the water stream through the valve system 10 to the outlet 32 and beyond such so as to reduce, and preferably eliminate, the potential for particulate matter to become trapped between the dome 90 and the ridge 262.

FIG. 10 shows the insert 250 and diaphragm 40 in an arrangement similar to that of FIG. 7. The diaphragm 40 is actuated so that the dome 90 moves away from the ridge 262 to permit passage of water and particulate matter therebetween, and so that the rib 94 moves away from the top side 252 of the insert 250 to form a gap G3. The water stream carries particulate matter through the gap G3 between the rib 94 and the top side 252 of the insert 250. The gap G3 is smaller than a gap G4 between the dome 90 and the ridge 262. Therefore, the gap G3 and the openings 260 serve to block particulate matter whose size exceeds a certain dimension, while sufficiently small particulate matter will continue to be carried through the valve system 10 by the water stream. The dimensions of the gaps G1, and G2 are generally applicable for the dimensions of the gaps G3, and G4.

The open position of FIG. 10 also provides the staged closing discussed with reference to FIG. 7. During the delay from when the solenoid system 18 is actuated to close the diaphragm 40 to when the diaphragm 40 has actually closed, the rib 94 will contact the insert 50 prior to the dome 90 doing so. After the rib 94 presses against the insert 250, the water within the periphery of the rib 94 will continue to pass through the center opening 52 of the insert, likewise for any strained particulate matter located therein, as a result of the flow through the openings 260. A short period later, the dome 90 will contact the ridge 262 to seal and close the valve system 10.

Figure 11:
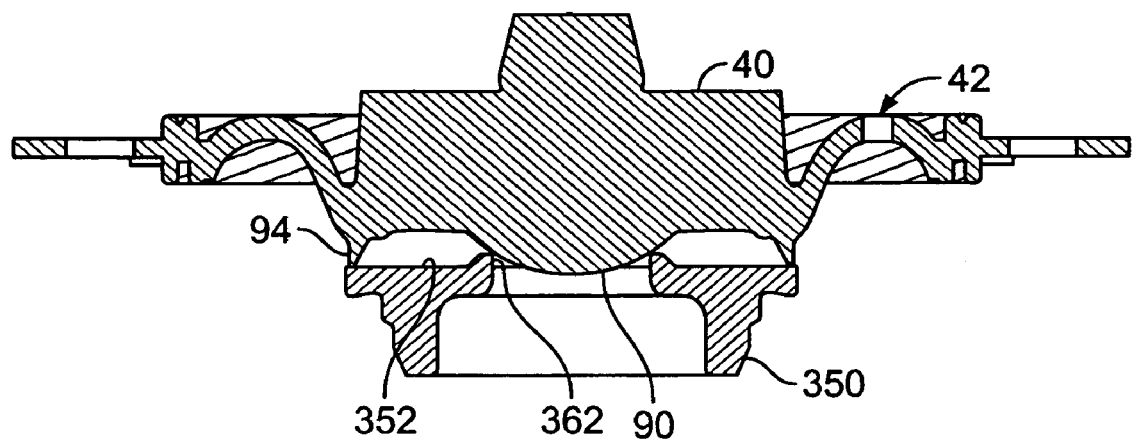
FIG. 11 is a cross-sectional view of the first embodiment of the diaphragm and a third embodiment of a valve seat insert in a closed position.
Figure 12:
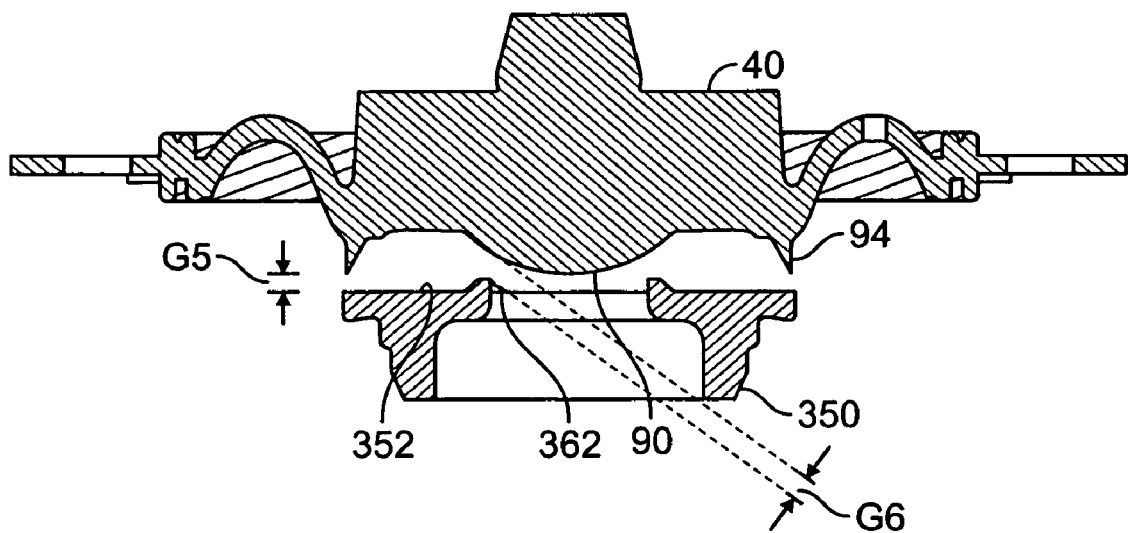
FIG. 12 is a cross-sectional view corresponding to FIG. 11 in an open position.

FIGS. 11 and 12 depict a third embodiment of the insert, referenced as insert 350, and the diaphragm 40. The insert 350 has a top side 352 with a continuous, uninterrupted surface. As depicted in FIG. 11, a closed position is depicted wherein the annular rib 94 of the diaphragm 40 is in contact with the top side 352, and wherein the dome 90 is in contact with a ridge 362 on the insert 350.

With this embodiment of the insert 350, any foreign particulate matter that may become trapped between the rib 94 and the insert 350, or between the dome 90 and the ridge 362, does not completely or necessarily violate the integrity of the seal between the diaphragm 40 and the insert 350. More specifically, the contact between the dome 90 and the ridge 362 and the contact between the rib 94 and the insert 350 combine to form a seal that seals completely or enough such that an undesirable amount of water does not pass through the valve.

FIG. 12 depicts the diaphragm 40 and the insert 350 in an open position. The solenoid system 18 is actuated such that the dome 90 and the rib 94 of the diaphragm 40 move away from the insert 350, thereby permitting water and particulate matter therein to pass between a gap G5 between the rib 94 and the insert top side 352 and between the dome 90 and the ridge 362. However, the gap G5 also performs the blocking or screening function described above for gaps G1 and G3 for the inserts 50 and 250. Because the gap G5 is smaller than a gap G6 between the dome 90 and the ridge 362, particulate matter of a relatively substantial size will be prevented from passing through the gap G5 and, therefore, is not trapped between the diaphragm 40 and insert 350. The dimensions of the gaps G1, and G2 are generally applicable for the dimensions of the gaps G5, and G6.

The insert 350 further benefits from the above-described staged closing. Particulate matter located between the diaphragm 40 and the insert 350 when the diaphragm 40 begins to close will continue to pass through the valve system 10. The gap G5 will reduce in size as the rib 94 approaches the insert 350, and the size of particulate matter that is able to pass by the rib 94 will be reduced accordingly. Any particulate matter that passes by the rib 94 will flow through the valve system 10 to the outlet 32.

Figure 13:
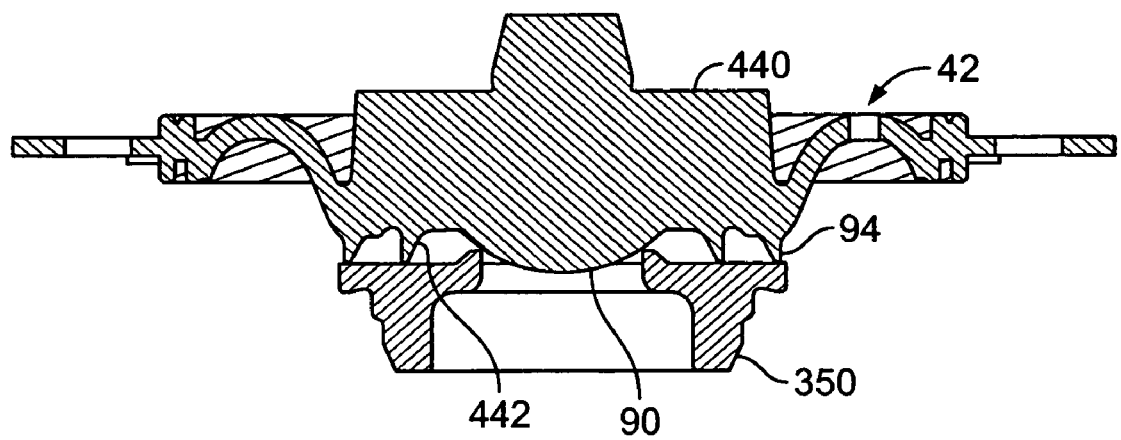
FIG. 13 is a cross-sectional view of a second embodiment of a diaphragm and the third embodiment of the valve seat insert in a closed position.
Figure 14:
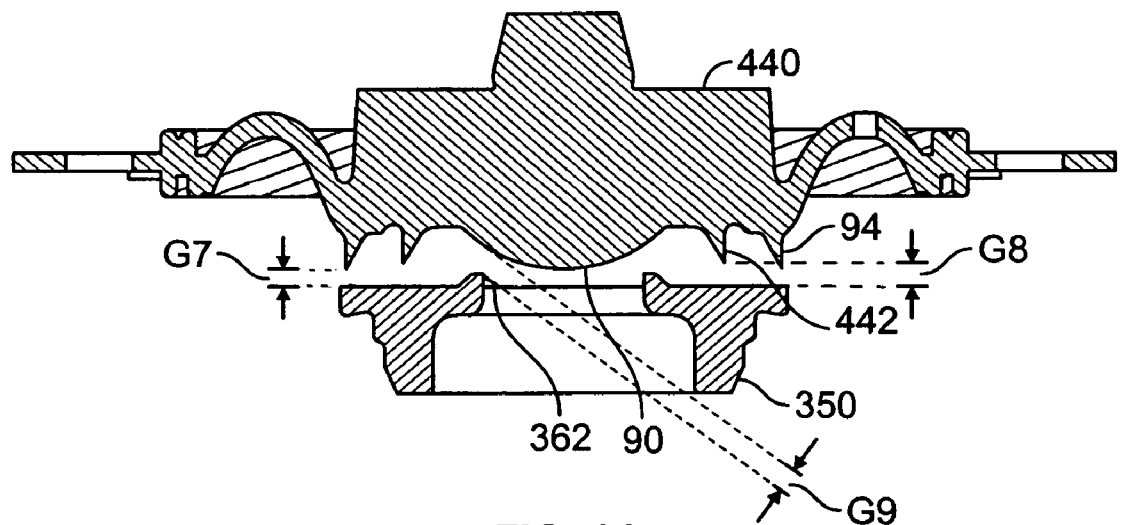
FIG. 14 is a cross-sectional view corresponding to FIG. 13 in a first open position.

A further embodiment of the diaphragm, referenced to herein as diaphragm 440, is depicted in cooperation with the insert 350 in FIGS. 13 and 14. The diaphragm 440 is similar in features and operation to the diaphragm 40, with the addition of a second, additional annular rib 442. FIG. 13 depicts the diaphragm 440 in a closed position, while FIG. 14 shows the diaphragm 440 in an open position. In the closed position, the dome 90 and the ribs 94 and 442 combine to form a seal that seals completely or enough such that an undesirable amount of water does not pass through the valve even when foreign particulate matter is trapped between one or more of the dome 90 and ribs 94, 442 and their respective seating surfaces on the insert 350.

In the open position, the ribs 94, 442 and the dome 90 are each separated from the insert 350. Rib 94 is separated from the insert by gap G7 while rib 442 is separated from the insert 350 by gap G8, and the gaps G7, G8 may be a same or different size. Again, the ribs 94, 442 perform a screening function for particulate matter. Preferably, the gaps G7 and G8 are smaller than a gap G9 between the dome 90 and the annular ridge 362. Furthermore, when the diaphragm 440 moves from an open position to a closed position, there is a staged closing wherein, preferably, the outer ribs 94, 442 close first, and then the dome 90 seats on the ridge 362. The dimensions of the gaps G1, and G2 are generally applicable for the dimensions of the gaps G7, and G9.

When the diaphragm 440 is utilized with either of the inserts 50 and 250, the additional rib 442 is located radially within the respective openings 104, 260. In this manner, the additional rib 442 performs a screening function such that particulate matter that may pass through a gap or through the openings is further prevented from passing to the dome and ridge interface.

It should be noted that either of the diaphragms 40, 440 may be utilized in conjunction with each of the inserts 50, 250, 350. Additionally, the geometry, position, and size of any openings or ribs on the inserts and diaphragms may also be altered or combined for specific desired capabilities.

As discussed above, closing these types of valve systems can be violent and may cause a physical shock to the system. The rapid movement of the water between the dome 90 and the inserts 50, 250, 350, for example, produces friction between the water and the dome 90 such that the dome 90 is rapidly accelerated towards and against the inserts 50, 250, 350. In order to limit the speed and impede bouncing of the dome 90 against the inserts 50, 250, 350, the diaphragms 40, 440 provide hydraulic damping. More specifically, the ribs 94, 442 are resiliently deformable, and water is trapped between the ribs 94, 442 and the dome 90. As the diaphragm 40, 440 moves towards the insert 50, 250, 350, the water trapped inside the diaphragm is pressurized by the ribs 94, 442. This pressurized water, and the deformability of the ribs 94, 442, damps the movement and any bouncing of diaphragm against the insert 50, 250, 350.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A valve comprising:
   a body defining an inlet, an outlet and a passage connecting the inlet with the outlet;
   a flexible diaphragm having a periphery secured to the body and a generally center portion;
   at least one depending rib extending from the flexible diaphragm about the center portion and toward the body;
   the diaphragm movable between a first position spaced from the body to promote flow from the inlet through the passage to the outlet and a second position wherein the center portion and the at least one rib contact the body to block flow through the passage;
   wherein the first position includes the at least one rib being spaced less from the body than the center portion to limit flow of at least some foreign particles exceeding a predetermined size depending on the spacing of the at least one rib from the body from flowing past the rib and becoming trapped between the center portion and the body; and
   wherein the body has a first portion for contacting the center portion and a second portion for contacting the at least one rib, the valve further comprising a second depending rib extending from the flexible diaphragm about the center portion and toward the second portion and being spaced radially outward from the at least one depending rib, the second rib being spaced from the second portion to promote flow through the passage while the diaphragm is in the first position, and wherein at least a portion of the second rib contacts the second portion of the body to block flow through the passage while the diaphragm is in the second position.

2. A valve in accordance with claim 1 wherein in the first position, the center portion is spaced from the first portion more than the second rib is spaced from the second portion to limit flow of at least some foreign particles exceeding a predetermined size depending on the spacing of the second rib from the body from flowing past the second rib and becoming trapped between the center portion and the body.

3. A valve in accordance with claim 1 wherein the center portion and the first and second ribs cooperate to substantially block flow through the passage even when foreign particles are trapped between the body and any one or more of the center portion and the first and second ribs.

4. A valve in accordance with claim 1 wherein the second portion has a substantially flat portion that is contacted by the second depending rib when in the second position.

5. A valve in accordance with claim 4 wherein the first and second ribs are annular about the center portion of the flexible diaphragm.

6. A valve in accordance with claim 5 wherein the first portion is annular and extends beyond the second portion.

7. A valve in accordance with claim 6 further comprising an insert mounted to the body and the insert having the first portion and second portion of the body.

8. A valve in accordance with claim 1 wherein the first and second ribs are configured to dampen against vibrational movement of the generally center portion of the diaphragm as the center portion moves from the first position to the second position.

9. A valve comprising:
   a body defining an inlet, an outlet and a passage connecting the inlet with the outlet and having a first portion and a second portion;
   a flexible diaphragm having a periphery secured to the body and a generally center portion movable between a first position spaced from the body to promote flow from the inlet through the passage and to the outlet and a second position wherein at least a portion of the center portion contacts the first portion of the body to block flow through the passage;
   a first depending rib extending from the flexible diaphragm about the center portion and toward the body and being spaced from the body in the first position to promote flow from the inlet through the passage to the outlet; and
   a second depending rib extending from the flexible diaphragm about the center portion and toward the second portion and being spaced radially outward from the first depending rib, the second rib being spaced from the second portion to promote flow through the passage while the diaphragm is in the first position, and wherein at least one of the depending ribs contacts the second portion of the body to block flow through the passage while the diaphragm is in the second position,
   wherein the first position includes at least one of the depending ribs being spaced less from the body than the center portion is spaced from the first portion to limit flow of at least some foreign particles through the passage when the diaphragm is in the first position,
   wherein the center portion and at least one depending rib cooperate to substantially block flow through the passage even when foreign particles are trapped between one or more of the center portion and the first portion and at least one of the depending ribs and the second portion when the diaphragm is in the second position, and
   wherein the second portion has a substantially flat portion that is contacted by at least one of the depending ribs when in the second position.

10. A valve in accordance with claim 9 wherein in the first position, the center portion is spaced from the first portion more than the second rib is spaced from the second portion to limit flow of at least some foreign particles through the passage when the second rib is in the first position.

11. A valve in accordance with claim 9 wherein in the second position, the center portion and the first and second ribs cooperate to substantially block flow through the passage even when foreign particles are trapped between the body and any one or more of the center portion and the first and second ribs.

12. A valve in accordance with claim 9 wherein the first and second ribs are annular about the center portion of the flexible diaphragm.

13. A valve in accordance with claim 9 wherein the first portion is annular and extends beyond the second portion.

14. A valve in accordance with claim 9 further comprising an insert mounted to the body and the insert having the first portion and second portion of the body.

15. A valve in accordance with claim 9 wherein the first and second ribs are configured to dampen against vibrational movement of the center portion of the diaphragm as the center portion moves from the first position to the second position.

* * * * *